United States Patent
Kurian et al.

(10) Patent No.: US 10,609,761 B2
(45) Date of Patent: Mar. 31, 2020

(54) ADAPTIVE SIGNAL STRENGTH THRESHOLDS FOR PEER-TO-PEER SYNCHRONIZATION AND DATA COMMUNICATION

(71) Applicant: Apple Inc., Cupertino, CA (US)

(72) Inventors: Lawrie Kurian, San Jose, CA (US); Anand Rajagopalan, Saratoga, CA (US); Saravanan Balasubramaniyan, Los Gatos, CA (US); Tashbeeb Haque, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 305 days.

(21) Appl. No.: 15/590,778

(22) Filed: May 9, 2017

(65) Prior Publication Data

US 2017/0339733 A1    Nov. 23, 2017

Related U.S. Application Data

(60) Provisional application No. 62/338,133, filed on May 18, 2016.

(51) Int. Cl.
| | |
|---|---|
| H04W 76/14 | (2018.01) |
| H04W 84/08 | (2009.01) |
| H04W 76/23 | (2018.01) |
| H04W 4/70 | (2018.01) |
| H04W 8/00 | (2009.01) |

(52) U.S. Cl.
CPC ............ *H04W 84/08* (2013.01); *H04W 4/70* (2018.02); *H04W 76/14* (2018.02); *H04W 76/23* (2018.02); *H04W 8/005* (2013.01)

(58) Field of Classification Search
CPC ....... H04W 84/08; H04W 4/70; H04W 76/14; H04W 76/23; H04W 8/005; H04W 76/10; H04W 4/80; H04B 3/544; H04B 7/18558
See application file for complete search history.

(56) References Cited

U.S. PATENT DOCUMENTS

| | | | |
|---|---|---|---|
| 8,862,134 B1 * | 10/2014 | Zhou | H04W 52/244 455/422.1 |
| 9,408,170 B2 | 8/2016 | Abraham et al. | |
| 9,516,615 B2 | 12/2016 | Stacey et al. | |
| 9,674,799 B2 * | 6/2017 | Mok | H04W 52/383 |
| 2004/0180671 A1 * | 9/2004 | Spain, Jr. | H04W 64/00 455/456.1 |
| 2015/0094114 A1 * | 4/2015 | Rao | H04W 52/245 455/522 |
| 2015/0181663 A1 * | 6/2015 | Gray | H05B 33/0803 315/185 R |
| 2015/0245335 A1 * | 8/2015 | Zhou | H04L 47/26 370/329 |

(Continued)

*Primary Examiner* — Andrew Wendell
(74) *Attorney, Agent, or Firm* — Kowert Hood Munyon Rankin and Goetzel PC; Jeffrey C. Hood; Brian E. Moore

(57) ABSTRACT

In some embodiments, one or more wireless stations operate to configure direct communication with neighboring mobile stations, e.g., direct communication between the wireless stations without utilizing an intermediate access point. Embodiments of the disclosure relate to adapting a signal strength metric threshold. In some embodiments, the signal strength metric may be adapted (or adjusted) to establish or maintain data communications with peer devices.

20 Claims, 11 Drawing Sheets

(56) References Cited

U.S. PATENT DOCUMENTS

2016/0127996 A1\* 5/2016 Patil .................... H04W 48/16
                                                    370/311
2016/0227496 A1   8/2016 Panteleev et al.
2017/0013153 A1\* 1/2017 Shin .................... H04W 76/10

\* cited by examiner

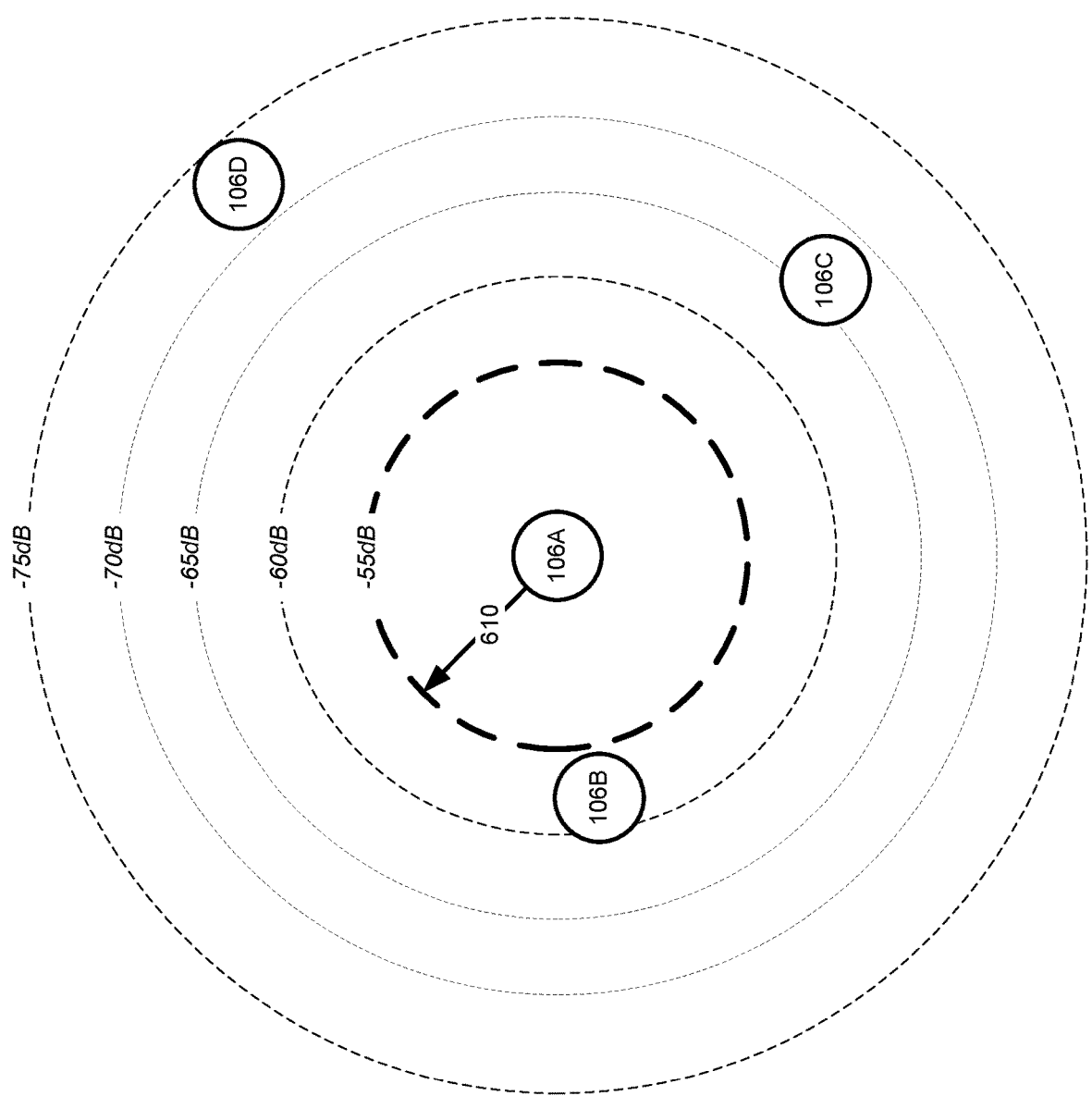

ADAPTIVE SIGNAL STRENGTH THRESHOLDS FOR PEER-TO-PEER SYNCHRONIZATION AND DATA COMMUNICATION

PRIORITY DATA

This application claims benefit of priority to U.S. Provisional Application Ser. No. 62/338,133, titled "Adaptive Signal Strength Thresholds for Peer-to-Peer Synchronization and Data Communication," filed May 18, 2016, by Lawrie Kurian, Anand Rajagopalan, Saravanan Balasubramaniyan, and Tashbeeb Haque, which is hereby incorporated by reference in its entirety as though fully and completely set forth herein.

FIELD

The present application relates to wireless communications, including techniques for wireless communication among wireless stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate directly with each other without using an intermediate access point. However, improvements in the operation of such devices are desired, including in setup and coordination of the communication between such devices.

SUMMARY

Some embodiments described herein relate to systems and methods for peer wireless stations (e.g., wireless stations configured to communicate with neighboring wireless stations without utilizing an intermediate access point) to adapt a signal strength metric threshold.

Some embodiments relate to a wireless station that includes one or more antennas, one or more radios, and one or more processors coupled (directly or indirectly) to the radios. At least one radio is configured to perform Wi-Fi communications, e.g., via a Wi-Fi interface. The wireless station may perform voice and/or data communications, as well as any or all of the methods described herein.

In some embodiments, one or more wireless stations operate to configure direct communication with neighboring mobile stations, e.g., direct communication between the wireless stations without utilizing an intermediate access point. Embodiments of the disclosure relate to adapting a signal strength metric threshold. In some embodiments, the signal strength metric may be adapted (or adjusted) to maintain data communications with peer devices.

In some embodiments, a wireless station (or a processor, processing element, and/or baseband processor wireless station) may be configured to establish a data communication volume (or radio sphere for data communication sessions) for peer-to-peer data communications with neighboring wireless stations and receive discovery beacons from one or more neighboring wireless stations located outside of the data communication volume. In addition, the wireless station may be configured to determine at least one signal strength metric for each received discovery beacon and determine to synchronize to a first neighboring wireless station based, at least in part, on contents of the discovery beacon received from the first neighboring wireless station. The wireless station may be configured to adjust the data communication volume to a second size that includes the first neighboring wireless station. In some embodiments, the first size may be based, at least in part, on a value of a signal strength metric. In some embodiments, the signal strength metric may be based, at least in part, on a minimum of an average signal strength metric of active data communication sessions with neighboring wireless stations.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

FIGS. 6A-D illustrate an example of peer devices implementing an adaptive signal strength threshold, according to some embodiments.

Figure 1:
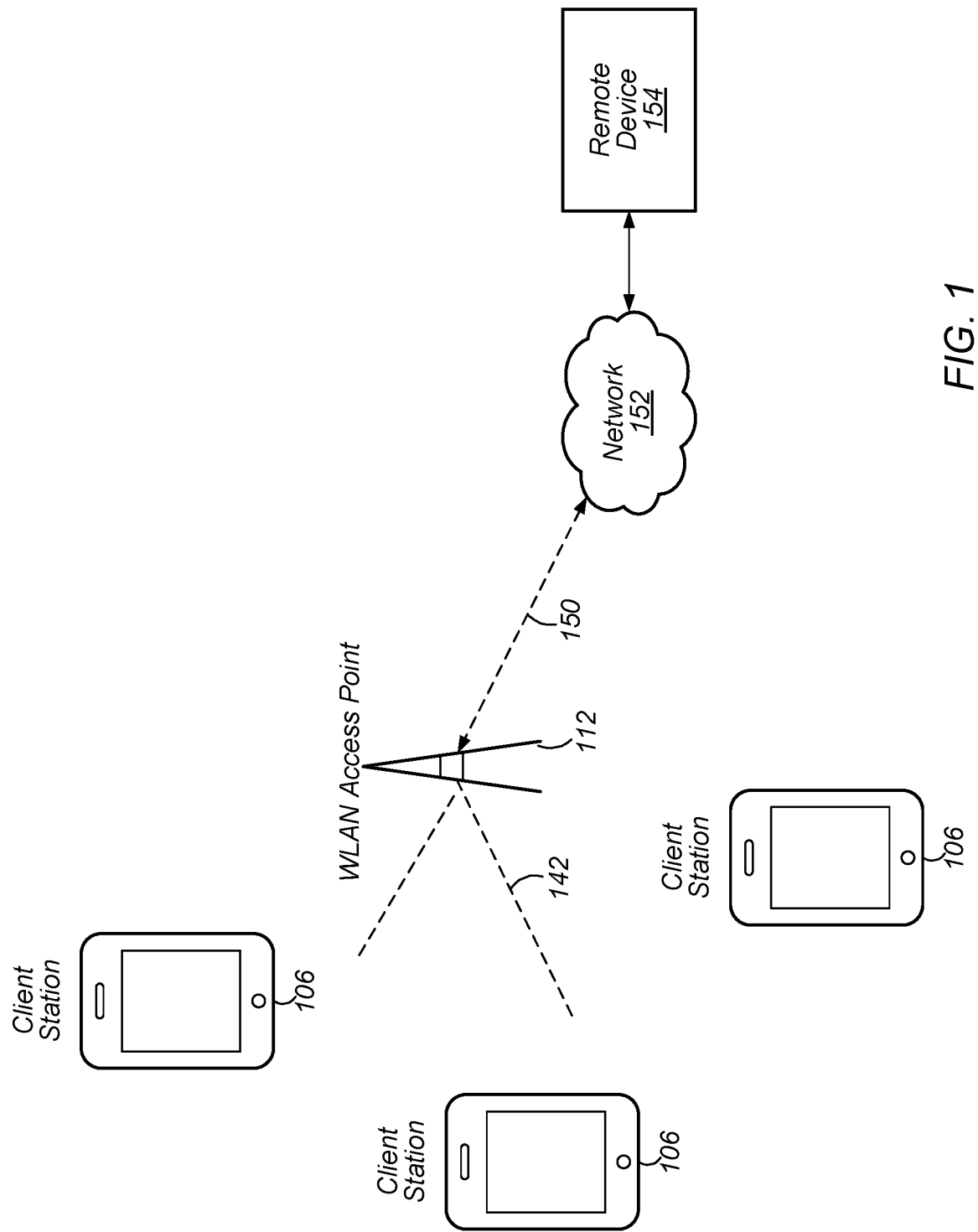
FIG. 1 illustrates an example WLAN communication system, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

UE: User Equipment
AP: Access Point
DL: Downlink (from BS to UE)
UL: Uplink (from UE to BS)
TX: Transmission/Transmit
RX: Reception/Receive
LAN: Local Area Network
WLAN: Wireless LAN
RAT: Radio Access Technology
DW: Discovery Window
NW: Negotiation Window
FAW: Further Availability Window
SID: Service ID
SInf: Service Information
Sinf-Seg: Service Information Segment
NW-Req: to request the peer NAN device to present in NW
CaOp: Capabilities and Operations elements
Security: Security preferences
SessionInfo: advertisement_id, session_mac, session_id, port, proto
ChList: preferred datapath channels
AM: anchor master
DW: discovery window
HCFR: hop count from remote devices
NAN: neighbor awareness network
SDA: service descriptor attribute
SDF: service discovery frame
SRF: service response filter
TSF: time synchronization function Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, PlayStation Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device (or Wireless Station)—any of various types of computer systems devices which performs wireless communications using WLAN communications. As used herein, the term "wireless device" may refer to a mobile device, as defined above, or to a stationary device, such as a stationary wireless client or a wireless base station. For example, a wireless device may be any type of wireless station of an 802.11 system, such as an access point (AP) or a client station (STA or UE). Further examples include televisions, media players (e.g., AppleTV™, Roku™, Amazon FireTV™, Google Chromecast™, etc.), refrigerators, laundry machines, thermostats, and so forth.

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various implementations of digital circuitry that perform a function in a computer system. Additionally, processing element may refer to various implementations of analog or mixed-signal (combination of analog and digital) circuitry that perform a function (or functions) in a computer or computer system. Processing elements include, for example, circuits such as an integrated circuit (IC), ASIC (Application Specific Integrated Circuit), portions or circuits of individual processor cores, entire processor cores, individual processors, programmable hardware devices such as a field programmable gate array (FPGA), and/or larger portions of systems that include multiple processors.

NAN data link (NDL)—refers to a communication link between peer wireless stations (e.g., peer NAN devices). Note that the peer devices may be in a common (e.g., same) NAN cluster. In addition, a NAN data link may support one or more NAN datapaths between peer wireless stations. Note further that a NAN data link may only belong to a single NAN data cluster.

NAN datapath (NDP)—refers to a communication link between peer wireless stations that supports a service. Note that one or more NAN datapaths may be supported by a NAN data link. Additionally, note that a NAN datapath supports a service between wireless stations. Typically, one of the peer wireless stations will be a publisher of the service and the other peer wireless station will be a subscriber to the service.

NAN cluster—refers to multiple peer wireless stations linked via synchronization to a common time source (e.g., a common NAN clock). Note that a peer wireless station may be a member of more than one NAN cluster.

NAN data cluster (NDC)—refers to a set of peer wireless stations in a common (e.g., same) NAN cluster that share a common base schedule (e.g., a NAN data cluster base schedule). In addition, peer wireless stations in a NAN data cluster may share at least one NAN data link that includes an active datapath with another member wireless station within the NAN data cluster.

Note that a peer wireless station may be a member of more than one NAN cluster; however, as noted previously, a NAN data link belongs to exactly one NAN data cluster. Note further, that in a NAN data cluster, all member peer wireless stations may maintain tight synchronization (e.g., via a NAN data cluster base schedule) amongst each other and may be present at a common (e.g., same) further availability slot(s) (or window(s)) as indicated by a NAN data cluster base schedule. In addition, each NAN data link may have its own NAN data link schedule and the NAN data link schedule may be a superset of a NAN data cluster base schedule.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, e.g., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Concurrent—refers to parallel execution or performance, where tasks, processes, signaling, messaging, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

The headings used herein are for organizational purposes only and are not meant to be used to limit the scope of the description. As used throughout this application, the word "may" is used in a permissive sense (e.g., meaning having the potential to), rather than the mandatory sense (e.g., meaning must). The words "include," "including," and "includes" indicate open-ended relationships and therefore mean including, but not limited to. Similarly, the words "have," "having," and "has" also indicated open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. For example, a "third component electrically connected to the module substrate" does not preclude scenarios in which a "fourth component electrically connected to the module substrate" is connected prior to the third component, unless otherwise specified. Similarly, a "second" feature does not require that a "first" feature be implemented prior to the "second" feature, unless otherwise specified.

FIG. 1—WLAN System

FIG. 1 illustrates an example WLAN system according to some embodiments. As shown, the exemplary WLAN system includes a plurality of wireless client stations or devices, or user equipment (UEs), 106 that are configured to communicate over a wireless communication channel 142 with an Access Point (AP) 112. The AP 112 may be a Wi-Fi access point. The AP 112 may communicate via a wired and/or a wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one wireless device 106 is configured to communicate directly with one or more neighboring mobile devices (e.g., via direct communication channels 140), without use of the access point 112.

In some embodiments, as further described below, a wireless device 106 may be configured to perform methods for adapting a signal strength metric threshold. In some embodiments, the signal strength metric may be adapted (or adjusted) to maintain data communications with peer devices. For example, in some embodiments, a wireless device may establish a radio sphere (e.g., for data communication sessions) and/or a data communication volume for communications with peer wireless devices (e.g., another wireless device 106 and/or access point 112). A size of the radio sphere may be based on a signal strength metric threshold as further described in detail below. The wireless device may receive discovery beacons from the peer wireless devices and determine signal strength metrics for each peer wireless device. In some embodiments, the wireless device may synchronize to peer wireless devices whose signal strength metrics exceed the signal strength metric threshold. In other words, the wireless device may synchronize to peer devices within the radio sphere.

Figure 2:
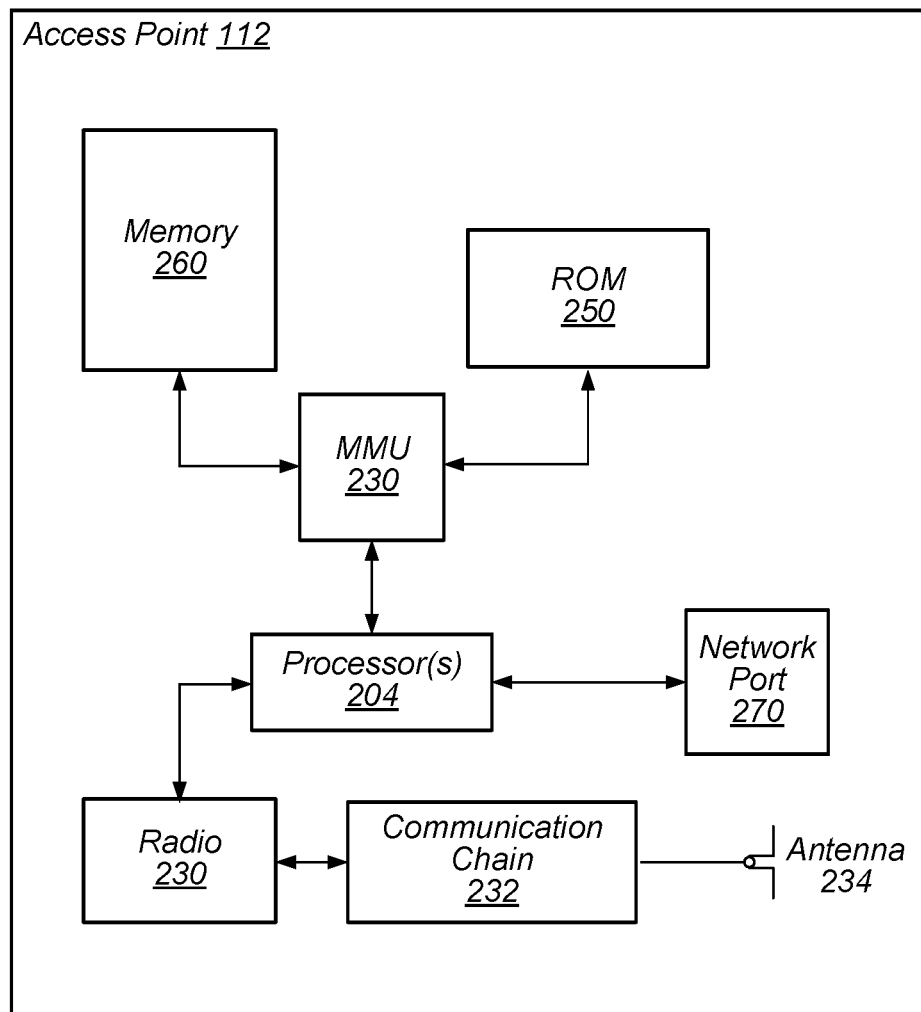
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is only one example of a possible system. As shown, the AP 112 may include processor(s) 204 which may execute program instructions for the AP 112. The processor(s) 204 may also be coupled (directly or indirectly) to memory management unit (MMU) 240, which may be configured to receive addresses from the processor(s) 204 and to translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, port 270 may be an Ethernet port. The local network may provide connectivity to additional networks, such as the Internet.

The AP 112 may include at least one antenna 234, which may be configured to operate as a wireless transceiver and may be further configured to communicate with mobile device 106 via wireless communication circuitry 230. The antenna 234 communicates with the wireless communication circuitry 230 via communication chain 232. Communication chain 232 may include one or more receive chains, one or more transmit chains or both. The wireless communication circuitry 230 may be configured to communicate via Wi-Fi or WLAN, e.g., 802.11. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

In some embodiments, as further described below, AP 112 may be configured to perform methods for adapting a signal strength metric threshold. In some embodiments, the signal strength metric may be adapted (or adjusted) to maintain data communications with peer devices. For example, in some embodiments, an access point may establish a radio sphere (e.g., for data communication sessions) and/or a data communication volume for communications with wireless devices (e.g., wireless devices 106). A size of the radio sphere may be based on a signal strength metric threshold as further described in detail below. The access point may receive discovery beacons from the wireless devices and determine signal strength metrics for each wireless device. In some embodiments, the access point may synchronize to wireless devices whose signal strength metrics exceed the signal strength metric threshold. In other words, the access point may synchronize to wireless devices within the radio sphere.

Figure 3:
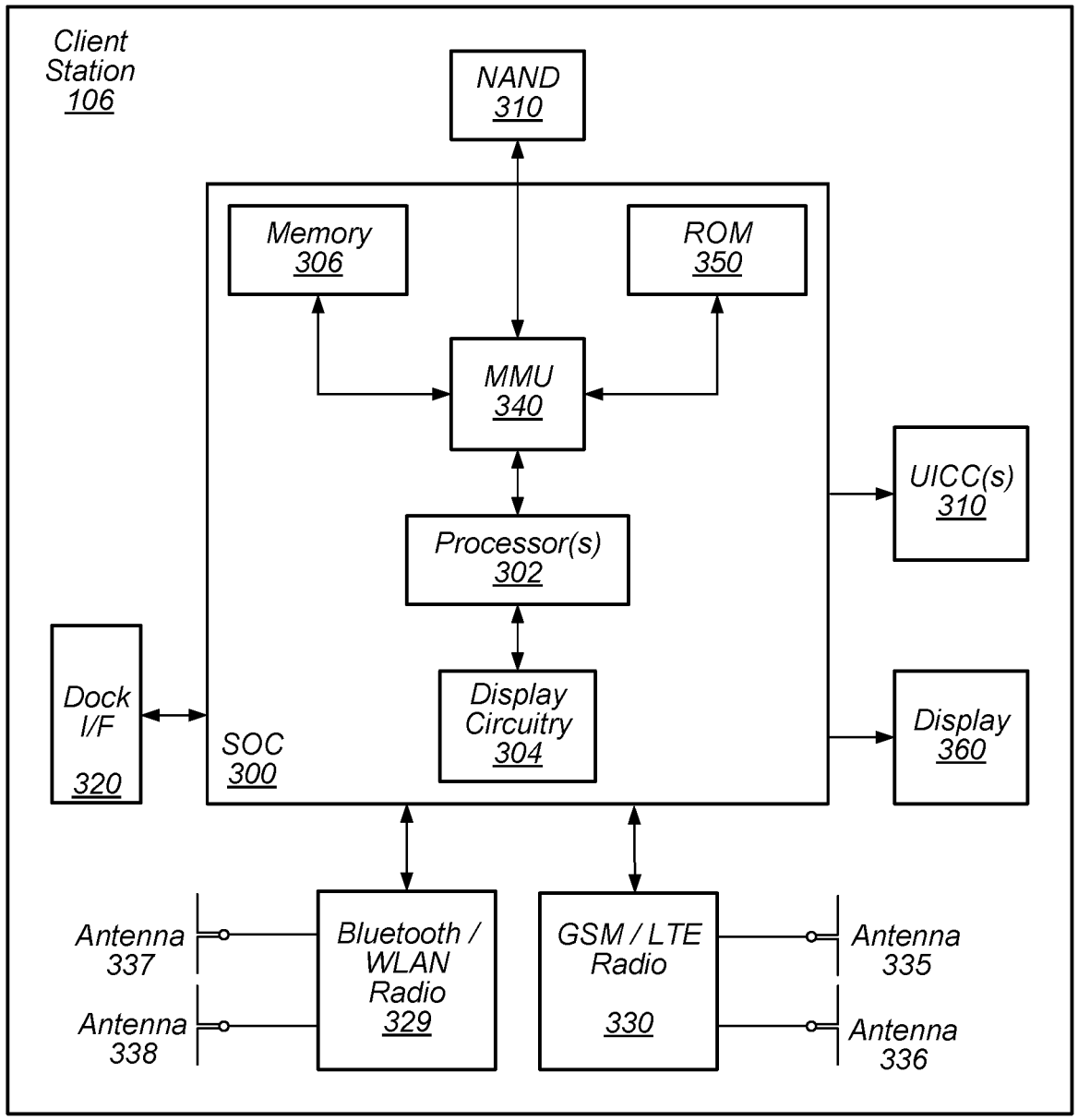
FIG. 3 illustrates an example simplified block diagram of a mobile station (UE), according to some embodiments.

FIG. 3—Client Station Block Diagram

FIG. 3 illustrates an example simplified block diagram of a client station 106. It is noted that the block diagram of the client station of FIG. 3 is only one example of a possible client station. According to embodiments, client station 106 may be a user equipment (UE) device, a mobile device or mobile station, and/or a wireless device or wireless station. As shown, the client station 106 may include a system on chip (SOC) 300, which may include portions for various purposes. The SOC 300 may be coupled to various other circuits of the client station 106. For example, the client station 106 may include various types of memory (e.g., including NAND flash 310), a connector interface (I/F) (or dock) 320 (e.g., for coupling to a computer system, dock, charging station, etc.), the display 360, cellular communication circuitry 330 such as for LTE, GSM, etc., and short to medium range wireless communication circuitry 329 (e.g., Bluetooth™ and WLAN circuitry). The client station 106 may further include one or more smart cards 310 that incorporate SIM (Subscriber Identity Module) functionality, such as one or more UICC(s) (Universal Integrated Circuit Card(s)) cards 345. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302, which may execute program instructions for the client station 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the client station 106 may be configured to communicate wirelessly directly with one or more neighboring client stations. The client station 106 may be configured to communicate according to a WLAN RAT for communication in a WLAN network, such as that shown in FIG. 1. Further, in some embodiments, as further described below, client station 106 may be configured to perform methods for adapting a signal strength metric threshold. In some embodiments, the signal strength metric may be adapted (or adjusted) to maintain data communications with peer devices. For example, in some embodiments, a client station may establish a radio sphere (e.g., for data communication sessions) and/or a data communication volume for communications with peer wireless devices (e.g., another client station 106 and/or access point 112). A size of the radio sphere may be based on a signal strength metric threshold as further described in detail below. The client station may receive discovery beacons from the peer wireless devices and determine signal strength metrics for each peer wireless device. In some embodiments, the client station may synchronize to peer wireless devices whose signal strength metrics exceed the signal strength metric threshold. In other words, the client station may synchronize to peer devices within the radio sphere.

As described herein, the client station 106 may include hardware and software components for implementing the features described herein. For example, the processor 302 of the client station 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 204.

Further, as described herein, cellular communication circuitry 330 and short range wireless communication circuitry 329 may each include one or more processing elements. In other words, one or more processing elements may be included in cellular communication circuitry 330 and also in short range wireless communication circuitry 329. Thus, each of cellular communication circuitry 330 and short range wireless communication circuitry 329 may include one or more integrated circuits (ICs) that are configured to perform the functions of cellular communication circuitry 330 and short range wireless communication circuitry 329, respectively. In addition, each integrated circuit may include circuitry (e.g., first circuitry, second circuitry, etc.) configured to perform the functions of cellular communication circuitry 330 and short range wireless communication circuitry 329.

Wi-Fi Peer to Peer Communication Protocol

In some embodiments, Wi-Fi devices (e.g., client station 106) may be able to communicate with each other in a peer to peer manner, e.g., without the communications going through an intervening access point. There are currently two types of Wi-Fi peer to peer networking protocols in the Wi-Fi Alliance. In one type of peer to peer protocol, when two Wi-Fi devices (e.g., wireless stations) communicate with each other, one of the Wi-Fi devices essentially acts as a pseudo access point and the other acts as a client device. In a second type of Wi-Fi peer to peer protocol, referred to as a neighbor awareness networking (NAN), the two Wi-Fi client devices (wireless stations) act as similar peer devices in communicating with each other, e.g., neither one behaves as an access point.

In a NAN system, each wireless station may implement methods to ensure that it is synchronized with a neighboring wireless station to which it is communicating. Further, a wireless station may negotiate a common discovery window for exchange of synchronization packets to help ensure the devices that are communicating directly with each other are properly synchronized to enable the communication. Once two wireless stations have the same discovery window they may exchange synchronization packets to stay synchronized with each other. The wireless stations may also use the discovery window to exchange service discovery frames to convey other information such as further availability beyond discovery windows.

The NAN protocol includes two aspects: 1) synchronization and discovery (NAN 1.0) and 2) datapath transmission (NAN 2.0). NAN 1.0 describes methods for NAN protocol synchronization and discovery. After two wireless stations have discovered each other (per NAN 1.0) they may implement a procedure to setup a NAN datapath between them so that they can properly communicate. After this, the two wireless stations arrange for a common datapath negotiation window so that they can negotiate capabilities, synchronization requirements, and exchange further service information. The datapath negotiation window is a time window that enables two wireless stations to communicate with each other so that they can negotiate these capabilities and synchronization requirements and exchange this further service information. Once the datapath negotiation window has been established and NAN datapath setup has been performed, the wireless stations may perform datapath synchronization to help ensure that the two stations stay synchronized with each other for proper communication. Finally, datapath resource allocation relates to two peer wireless stations communicating with each other regarding a common time slot and channel for communication. In other words, the two devices communicate with each other regarding which channel they should use and at which time slot, to help ensure proper communication between them. Additionally, the two devices communicate with each other regarding which channel and time slot each would prefer to use for future communications between the devices.

Embodiments described herein define methods for adapting a signal strength metric threshold.

Signal Strength Thresholds for Peer-to-Peer Communications

In some implementations of peer-to-peer communication (e.g., Apple Wireless Direct Link (AWDL) and NAN), peers may periodically transmit synchronization and/or discovery beacons on social channels (e.g., channels specified by AWDL and/or NAN for peer-to-peer communications at, for example, 2.4 GHz and/or 5 GHz) in order to synchronize communications and/or discover new peer devices. In addition, information carried in these beacons (e.g., synchronization and/or discovery beacons) may be used for master election, to form a synchronization tree, and/or for service discovery. Further, received signal strength indicator (RSSI) (a measurement of the power present in a received radio signal) may be one of the metrics used to filter out beacons from the farther or weaker peers. Thus, an RSSI threshold may be used to define a radio sphere within which peer devices may be synchronized and/or discovered. For example, if a first peer device does not receive (or filters out based in part on an RSSI threshold) synchronization/discovery beacons from a second peer device, then the first and second peer devices would not synchronize and/or the services offered by the second peer device would not be discoverable by the first peer device.

Figure 4:
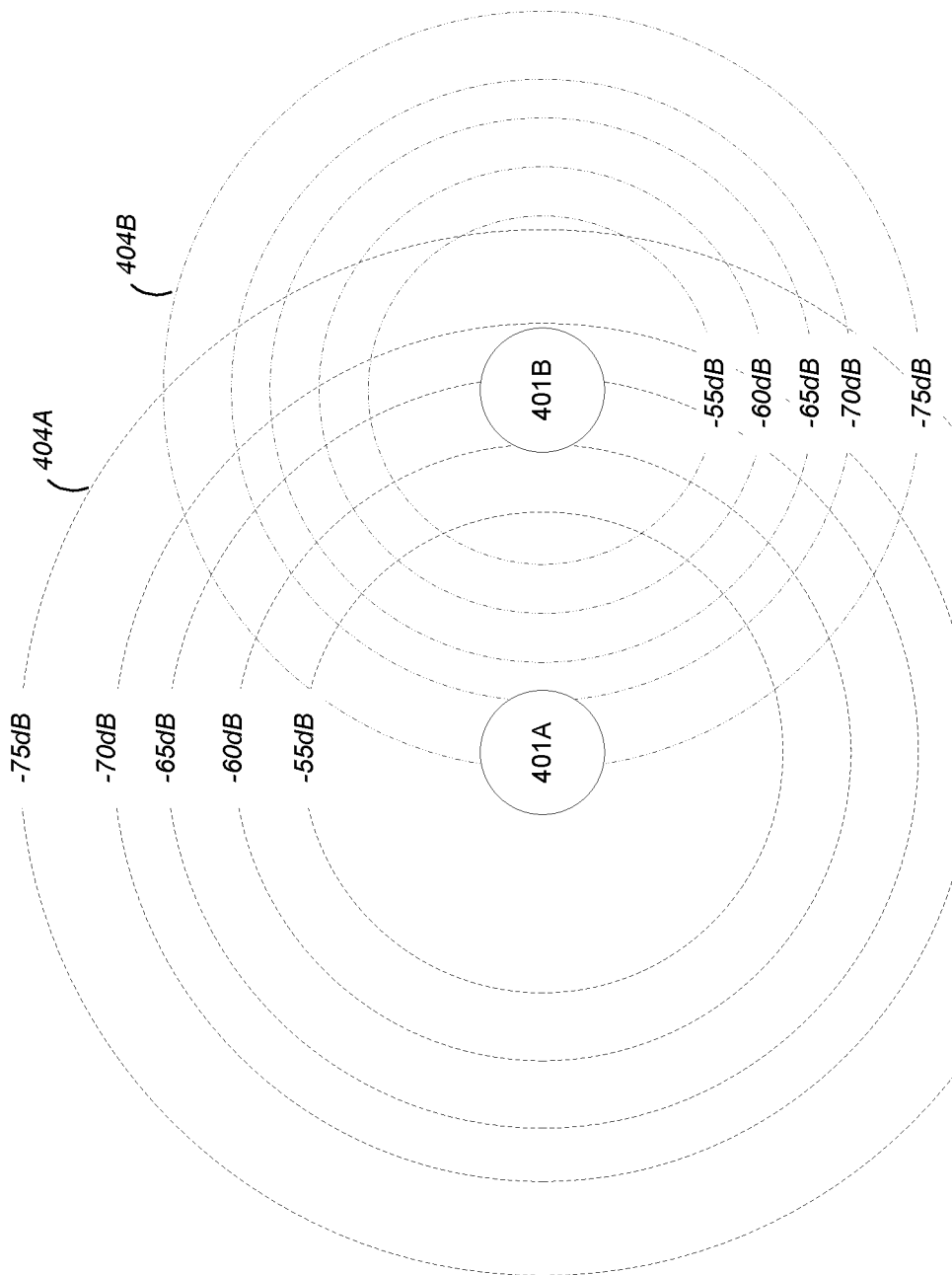
FIG. 4 illustrates an example implementation of discovery spheres for peer wireless stations.

In some implementations of peer-to-peer communications (e.g., AWDL and NAN) a fixed RSSI threshold is implemented for all peer devices. However, peer devices may have asymmetric behavior during synchronization and discovery, e.g., due to variance in transmission power used for transmission of beacons and/or due to variance in receiver sensitivity. In other words, a first peer device may be able to discover and/or synchronize to a second peer device, however, the second peer device may not be able to discover and/or synchronize to the first peer device due to differing RSSIs at the first and second peer device. For example, as illustrated by FIG. 4, device 401A may have a larger discovery sphere 404A than device 401B (with corresponding discovery sphere 404B) for similar values of RSSI, e.g., due to factors such as power, antenna sensitivity, and/or interference (e.g., from neighboring wireless devices). For example, as illustrated, for corresponding values of RSSI (e.g., −75 dB, −70 dB, −65 dB, −60 dB, −55 dB as shown), device 401A may have a larger discovery volume (sphere) than device 401B. Thus, for example, device 401A may synchronize to and/or discover device 401B if the RSSI threshold for devices 401A and 401B is set to −65 dB. However, as shown, device 401B may only be able to synchronize to and/or discover device 401A if the RSSI threshold is set to −70 dB for both devices.

Figure 5A:
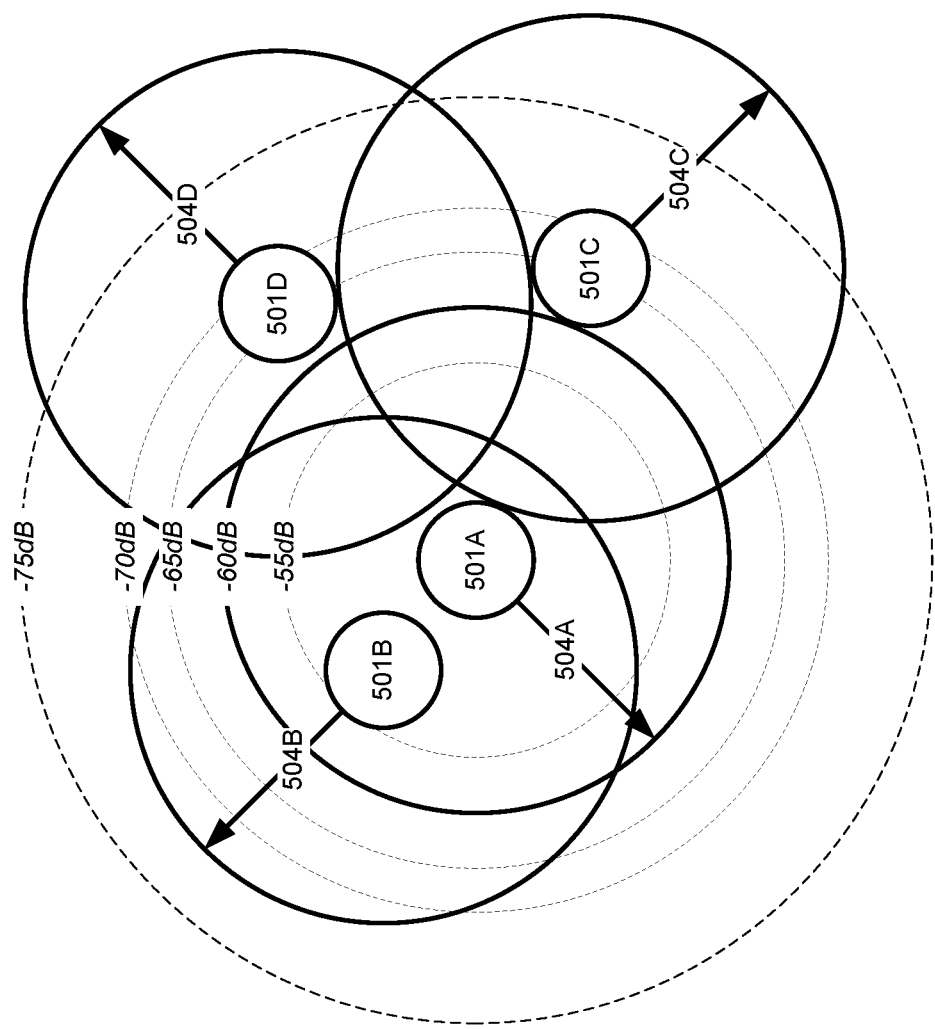
FIGS. 5A-B illustrate examples of implementations of fixed radius discovery spheres based on RSSI.
Figure 5B:
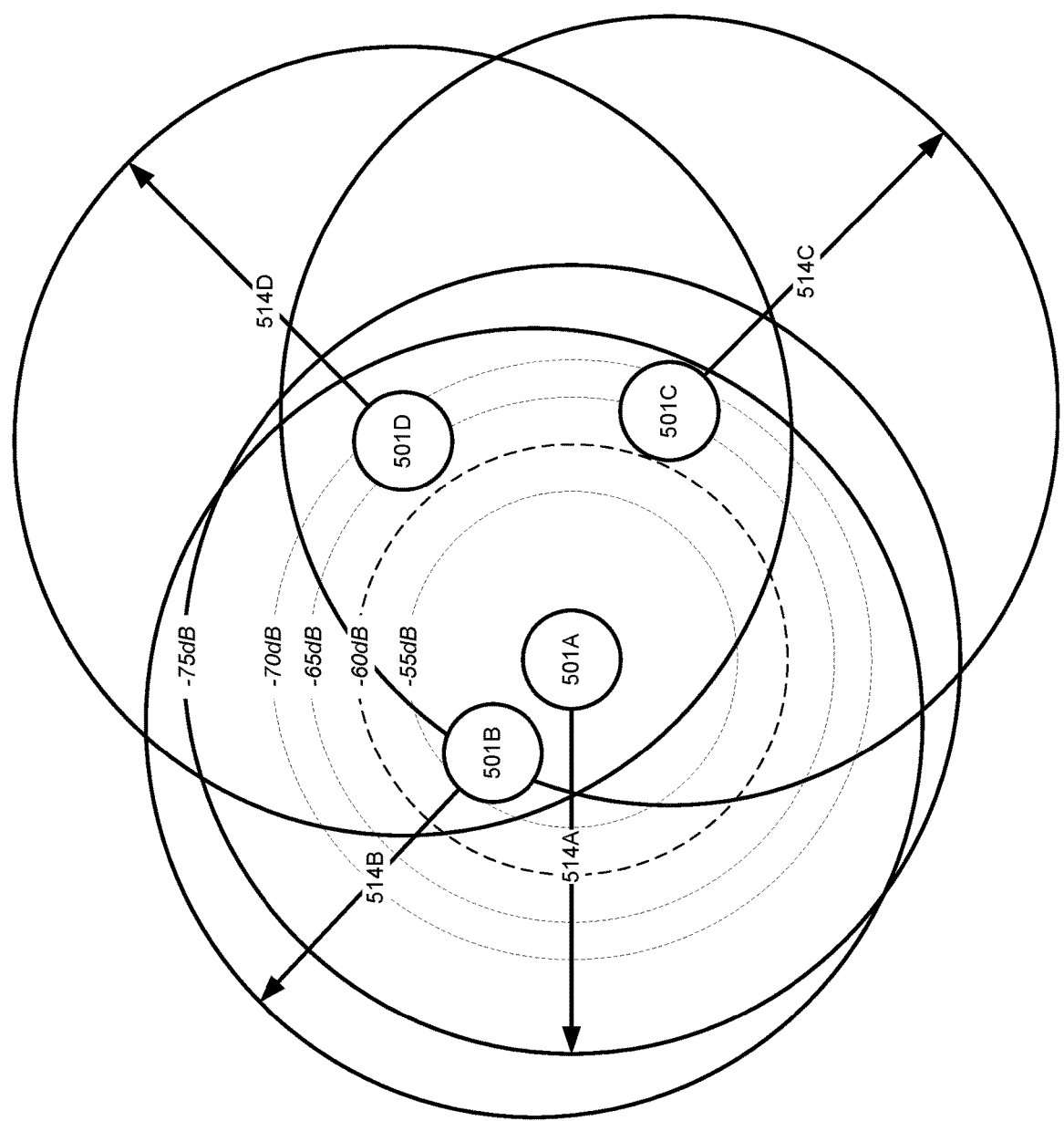

Other examples are illustrated at FIGS. 5A-5B. For the example illustrated by FIG. 5A, it is assumed that all peer devices (e.g., devices 501A-D) use a fixed RSSI threshold set to −60 dB (e.g., discovery radii 504A-D). Thus, based on this RSSI threshold, device 501A and device 501B may discover and/or synchronize to one another. However, device 501C and device 501D cannot discover device 501A, since device 501A is located outside the RSSI based discovery (or radio) sphere (e.g., based on discovery radii 504C and 504D, thus communications between device 501A and either or both of devices 501C or 501D would not be possible. Similarly, devices 501C and 501D cannot discover device 501B since device 501B is located outside the RSSI based discovery (or radio) sphere. However, as illustrated by FIG. 5B, if the RSSI threshold was decreased to −75 dB (thereby increasing the size of the discovery (or radio) sphere, e.g., as illustrated by discovery radii 514A-D), all devices would be discoverable (e.g., device 501A may be able to discover, and would be discoverable to, devices 501B, 501C, and 501D). Additionally, even if only devices 501A and 501B were in communication (e.g., established a NAN datapath), the decreased threshold would require that devices 501C and 501D be included in synchronization processes between devices 501A and 501B. Note that including farther devices (e.g., decreasing the RSSI threshold) may unnecessarily increase a probability of the synchronization processes becoming unstable.

In other words, for a fixed RSSI threshold, a higher RSSI threshold (e.g., a smaller discovery/synchronization/radio sphere) may allow for more reliable data communication with nearby peers and more stable synchronization among peers as compared to a lower RSSI threshold (e.g., a lager discovery/synchronization sphere). On the other hand, the higher RSSI threshold may exclude peers from discoverability more frequently, e.g., due to fluctuations in RSSI and signal attenuation that may be due to obstacles as compared to the lower RSSI threshold. Further, the lower RSSI threshold may allow for discovery and data communications with farther devices and/or devices with a weaker signal as compared to the higher RSSI threshold, however, entry of the farther devices may prolong (or delay) the election algorithm (e.g., for determining anchor synchronization roles in a cluster of devices) and may lead to unstable synchronization. In addition, fixed RSSI thresholds are susceptible to asymmetric RSSI between peer devices as described above.

Adaptive Signal Strength Thresholds

In some embodiments, as described herein, peer devices may implement adaptive signal strength thresholds. In some embodiments, reception of the synchronization and/or discovery beacons may not be filtered out based on signal strength metrics (e.g., RSSI and/or signal-to-noise-plus-interference ratio (SNIR)). In some embodiments, a default signal strength threshold (e.g., and RSSI or SNIR threshold) may be specified to define a radio sphere (e.g., for data communication sessions) and/or a data communication volume such that synchronization may occur only with nearby peer devices. Note that the size of the radio sphere may correspond to a coverage area (or communication range) of the radio sphere. In addition, although the coverage area is referred to as being spherical, the coverage area may be irregular due to various factors such as surrounding environment (e.g., obstacles), environmental noise (e.g., other sources of radio transmissions), and so forth. In some embodiments, election processes (or algorithms) may only include peers with beacons within the default signal strength threshold. Thus, only peers within the default signal strength threshold may remain synchronized.

In some embodiments, all received discovery beacons may be considered since the signal strength threshold may not be applied to all received discovery beacons. In addition, average signal strength metrics (e.g., average RSSI or average SNIR) for received beacons (discovery and/or synchronization) may be calculated and maintained in a database on some or all of the peer devices.

In some embodiments, all peers and corresponding supported services may be presented via a user interface, e.g., to a user. In other words, a peer device may know (or have knowledge of through reception of discovery beacons) the services offered by all peer devices within effective communication range, without respect to a signal strength metric threshold and corresponding radio sphere. The user interface may allow selection of a particular peer device based in part on services provided by the particular peer. In addition, the user interface may receive instructions to establish a data communication session (e.g., a NAN datapath) with the selected peer device. In some embodiments, if the signal strength metric(s) of the selected peer device would fall outside the default radio sphere (data communication volume) based on the default signal strength threshold, the default signal strength threshold may be adapted to accommodate data communication with the selected peer. Note that in some embodiments, the user interface may include notification(s) for peers with weaker signal strength such that peers with weaker signal strengths are not selected, e.g., so that the radio-sphere is not increased in size.

In some embodiments, the signal strength threshold may remain within a minimum and a maximum range, and the threshold may only be adapted within this range. In addition, in some embodiments, the signal strength threshold may be varied by a default factor (e.g., for an RSSI threshold, the RSSI threshold may be varied –/+X dB) within a range defined by the maximum and minimum. In some embodiments, an adaptive signal strength threshold may be the minimum of the average signal strength metric (e.g., minimum of average RSSI) of all the peers with an active data connection.

Figure 6B:
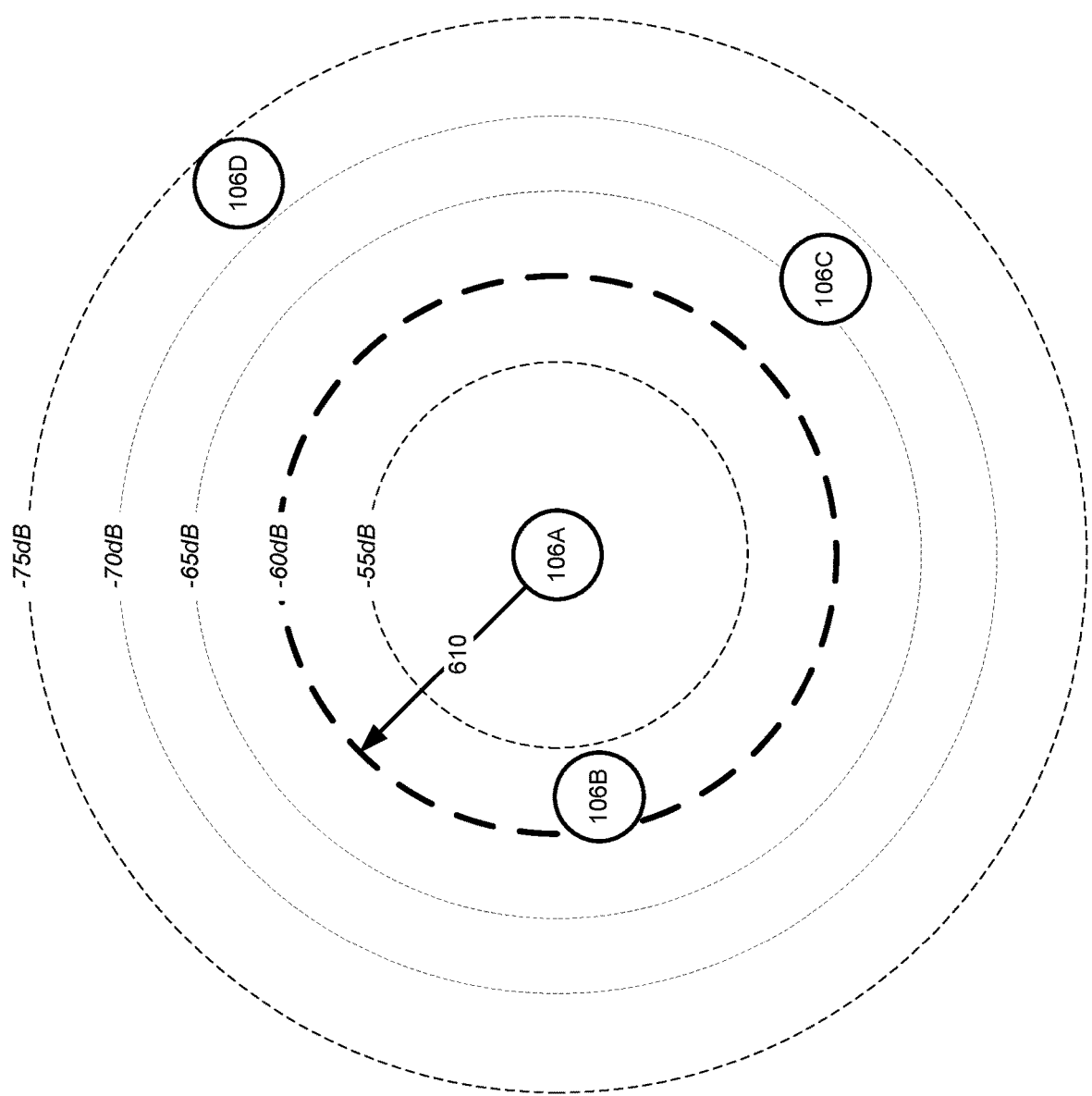
Figure 6C:
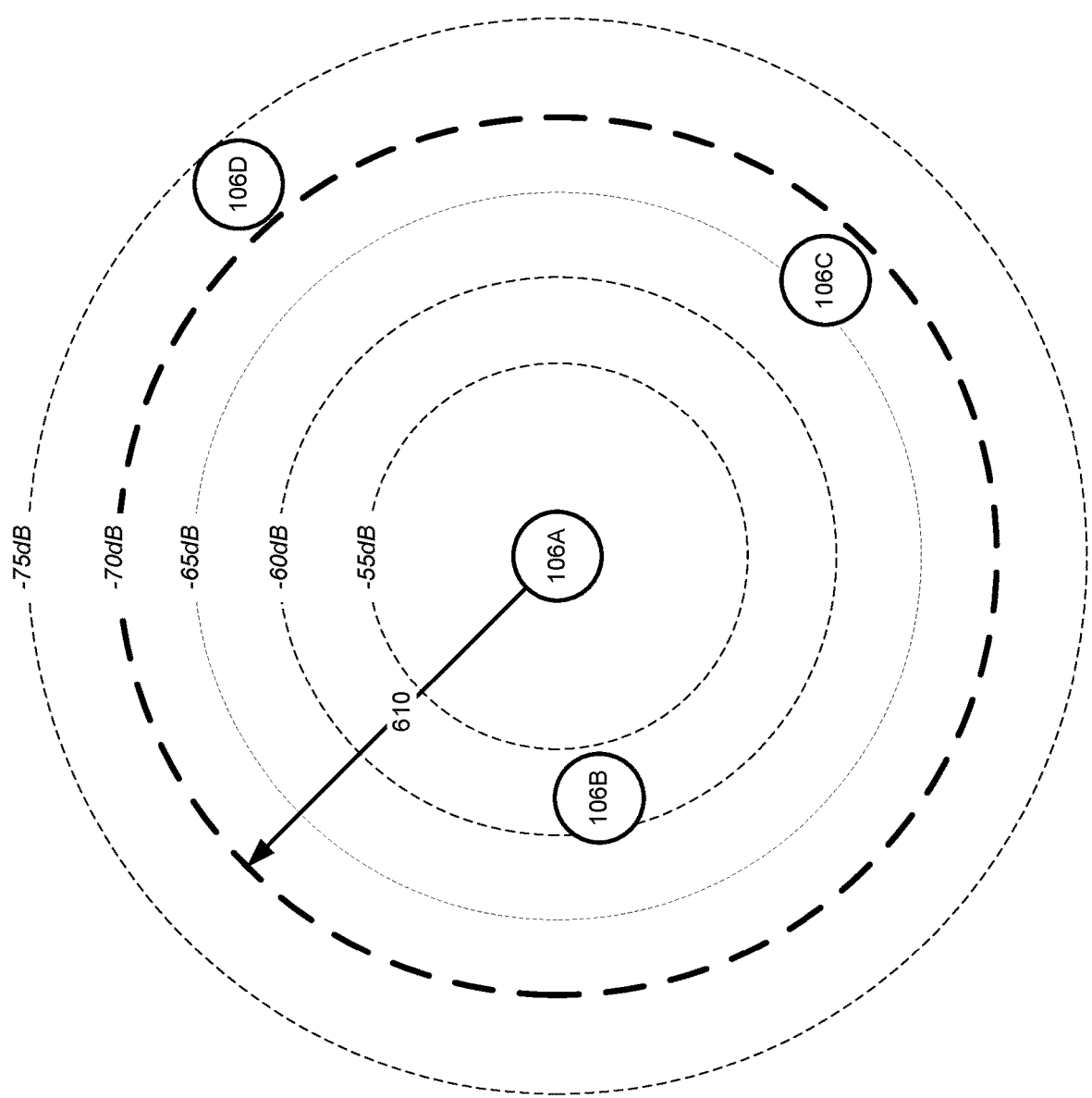

FIGS. 6A-6C illustrate an example of peer devices implementing an adaptive signal strength threshold, according to some embodiments. As illustrated at FIG. 6A, devices 106A-D may be peer devices and may include features as described above in reference to client station 106. Based on RSSI at device 106A, device 106B may be within a –60 dB radio sphere (or data communication volume), device 106C may be within a –70 dB radio sphere, and device 106D may be within a –75 dB radio sphere. In addition, device 106A may have an initial RSSI threshold of –55 dB as shown by discovery radius 610, thus all devices may be located outside device 106A's radio sphere that may be defined based on discovery radius 610. Note however, that in some embodiments, device 106A may have knowledge of services advertised by devices 106B-D since discovery beacons received from devices 106B-D may not be filtered out based on device 106A's radio sphere. Thus, if device 106A decides to subscribe to a service offered by device 106B, device 106A may adapt (or adjust) a size of its radio sphere (e.g., via adjustment of the RSSI threshold) to encompass communication with device 106B, as illustrated at FIG. 6B. Note that the size device 106A's radio sphere (e.g., as shown by discovery radius 610) may correspond to a coverage area (or communication range or data communication volume) of the radio sphere (and therefore, device 106A). In other words, if device 106A initiates data communications with device 106B, device 106A may adapt the RSSI threshold from –55 dB to –60 dB.

In addition, as illustrated by FIG. 6C, if device 106C decides to subscribe to a service offered by device 106A, device 106A may further adapt (or adjust) a size of its radio sphere (e.g., via adjustment of the RSSI threshold) to encompass communication with device 106C (e.g., as shown by discovery radius 610). In other words, if device 106C initiates data communications with device 106A, device 106A may further adapt the RSSI threshold from –60 dB to –70 dB to support data communications with device 106C.

Figure 6D:
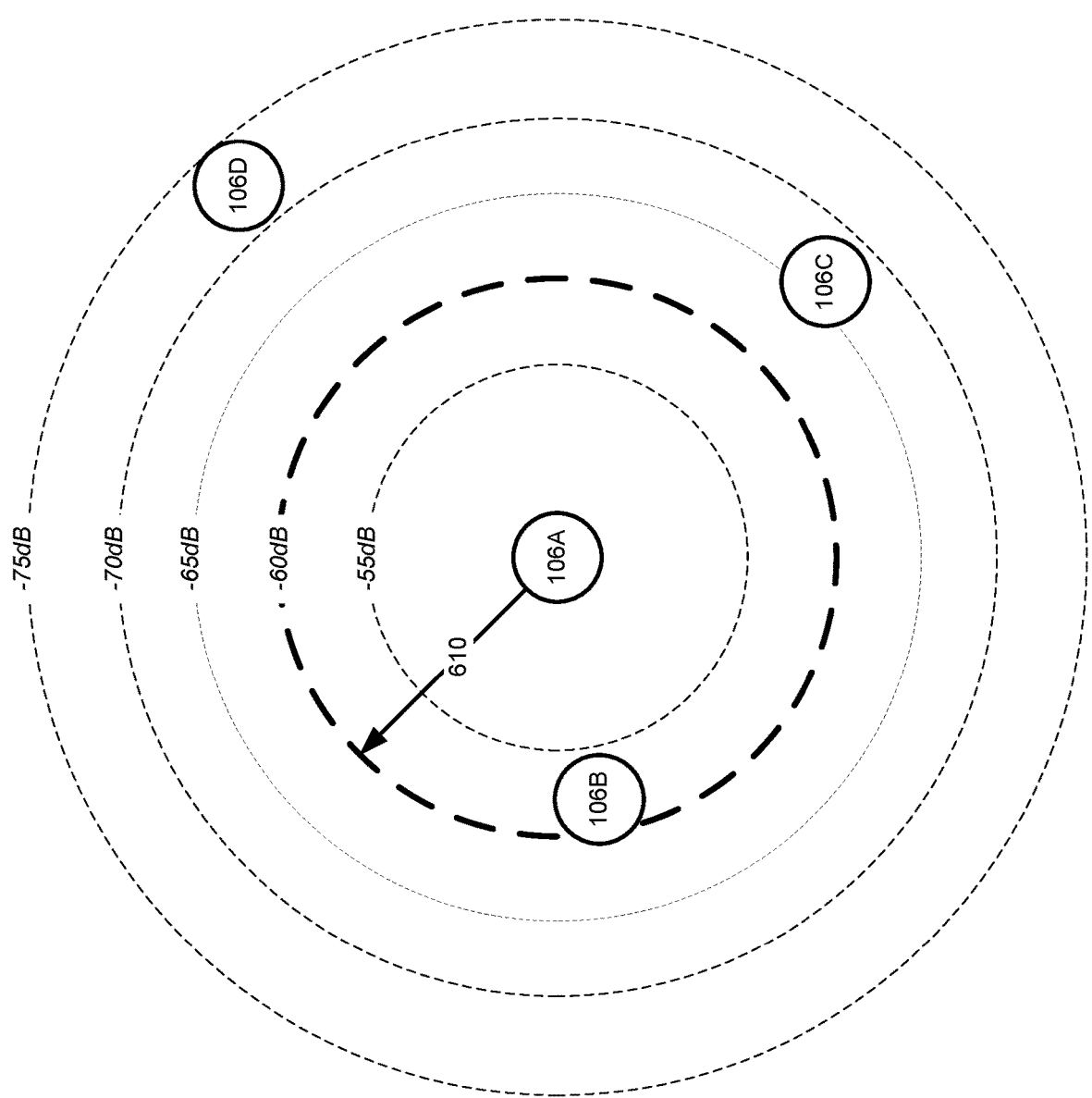

Further, as illustrated by FIG. 6D, once data communications between devices 106A and 106C are discontinued, device 106A may again adapt the RSSI threshold such that device 106A's coverage area does not include device 106C (e.g., as shown by discovery radius 610). In other words, once data communications with device 106C are discontinued, device 106A may again adapt the RSSI threshold, increasing the threshold from –70 dB to –60 dB.

In addition, although the coverage area of device 106A (the radio sphere) is referred to as being spherical, the coverage area may be irregular in shape due to various factors such as surrounding environment (e.g., obstacles), environmental noise (e.g., other sources of radio transmissions), and so forth.

Figure 7:
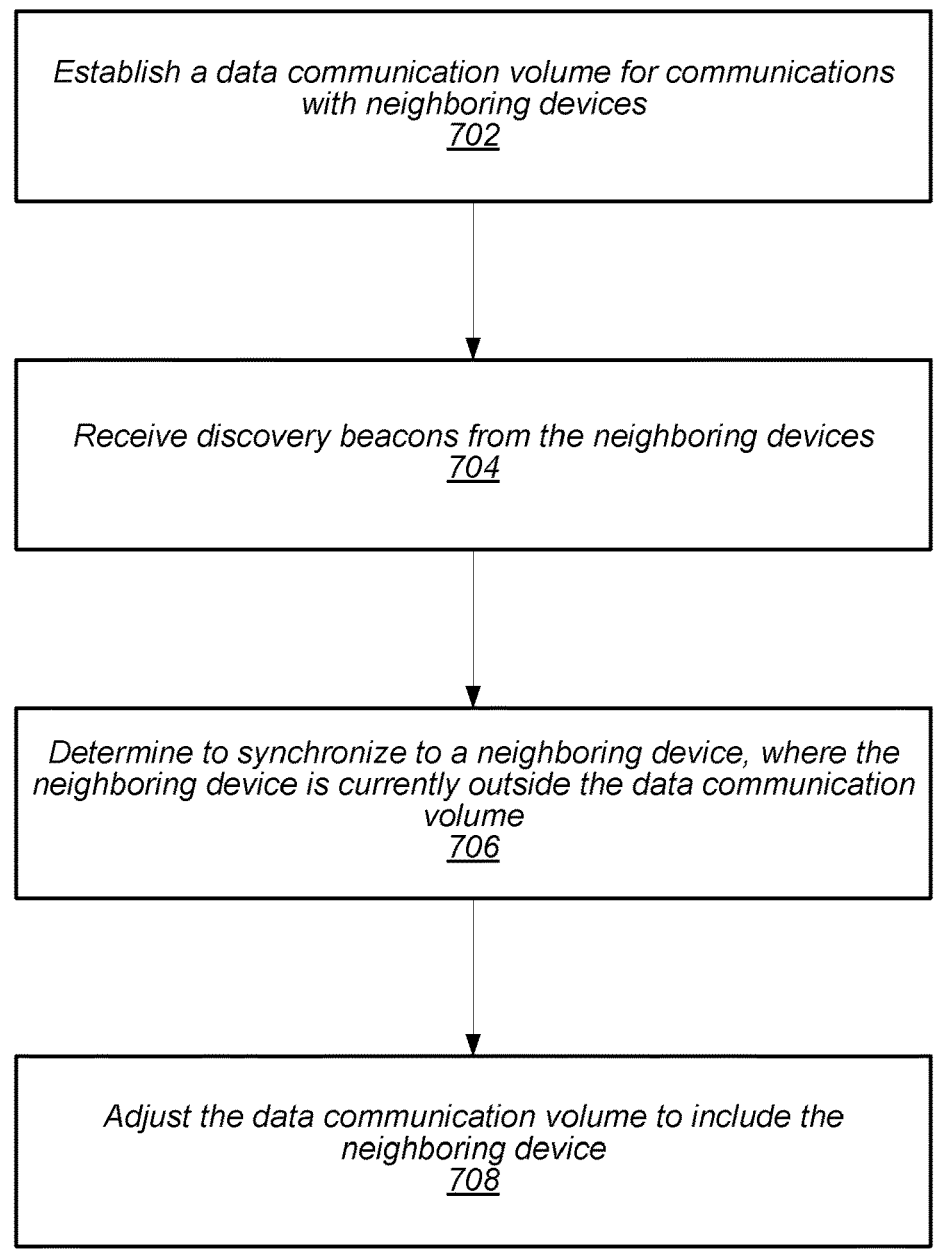
FIG. 7 illustrates a block diagram of an example of a method for a client station to adapt communication range based on services offered by peer client stations, according to some embodiments.

FIG. 7 illustrates a block diagram of an example of a method for a client station to adapt communication range based on services offered by peer client stations, according to some embodiments. The method shown in FIG. 7 may be used in conjunction with any of the systems or devices shown in the above Figures, among other devices. In various embodiments, some of the method elements shown may be performed concurrently, in a different order than shown, or may be omitted. Additional method elements may also be performed as desired. As shown, this method may operate as follows.

At 702, a wireless device, such as client station 106, may establish a data communication volume (or radio sphere) for communications (e.g., peer-to-peer data communication sessions or data sessions) with neighboring peer devices. In some embodiments, a first size of the data communication volume does not include neighboring peer devices with a current (or active) data session with the wireless device. In other words, the data communication volume includes a first set of neighboring peer devices the wireless device is currently exchanging data communications with, but does not include at least a portion of a second set of neighboring peer devices that the wireless device is not currently exchanging data communications with, although beacons (e.g., discovery and/or synchronization beacons) may be received from the second set of neighboring peer devices. In some embodiments, the first size of data communication volume may be based (at least in part) on a signal strength metric threshold. In some embodiments, a value of the signal strength metric threshold may be within a range and the range may be defined by a predetermined minimum and a predetermined maximum. In some embodiments, to establish the first size of the data communication volume, the wireless device may determine the first size based, at least in part, on a minimum of an average signal strength metric of active data communication sessions, e.g., with the first set of neighboring peer devices. In some embodiments, the signal strength metric may be one of received signal strength indicator and/or a signal-to-noise-plus-interference ratio.

At 704, discovery beacons from the neighboring peer devices may be received, e.g., from the portion of the second set of neighboring peer devices located outside of the data communication volume. Note that although the second set of neighboring peer devices may be located outside a current data communication volume, the wireless device may still receive beacons from such devices. In other words, unlike data communication sessions, there may be no requirement on signal strength (e.g., based on one or more signal strength metrics) for receiving beacons.

At 706, the wireless device may determine to synchronize to a neighboring peer device currently located outside the data communication volume. In some embodiments, the wireless device may determine at least one signal strength metric for each discovery beacon received. In addition, to determine whether to synchronize to the neighboring peer device, the wireless device may consider contents of the discovery beacon received from the neighboring peer device, e.g., the contents may indicate that the neighboring peer device offers a service sought (desired) by the wireless device and/or the contents may indicate that the neighboring peer device seeks a service offered by the wireless device.

At 708, the data communication volume (or radio sphere) may be adjusted to include the neighboring peer device. In some embodiments, adjusting the data communication volume may include increasing the data communication volume to a second size, e.g., based on the signal strength metric for the neighboring peer device. In some embodiments, adjusting the data communication volume to the second size may include decreasing a signal strength metric threshold from a first value to a second value. In some embodiments, the signal strength metric threshold may be decreased (or increased) by a predefined factor.

In some embodiments, the wireless device may receive a request to establish a data communication session with another neighboring peer device from the second set of neighboring peer devices (e.g., based in part on a signal strength metric of the neighboring peer device not exceeding a first value of a signal strength metric threshold associated with the second size of the data communication volume) and adjust the data communication volume to a third size to include the neighboring peer device. In some embodiments, adjusting to the third size may include adjusting the first value of the signal strength metric threshold to a second value. In addition, the wireless device may establish the data communication session with the neighboring peer device. In some embodiments, the wireless device may then discontinue the data communication session with the neighboring peer device and adjust the signal strength metric threshold from the second value to the first value thereby adapting the data communication volume from the third size to the second size.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device (or wireless station) may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless station, comprising:
at least one antenna;
at least one radio in communication with the at least one antenna and configured to perform communications via a Wi-Fi interface; and
at least one processor in communication with to the at least one radio;
wherein the at least one processor is configured to cause the wireless station to:
    establish a data communication volume for peer-to-peer data communications, wherein a first size of the data communication volume does not include neighboring wireless stations;
    receive one or more discovery beacons from one or more neighboring wireless stations located outside of the data communication volume;
    determine at least one signal strength metric for a discovery beacon received from a first neighboring wireless station of the one or more neighboring wireless stations;
    determine, based at least in part on contents of the discovery beacon received from the first neighboring wireless station, to synchronize to the first neighboring wireless station; and
    adjust the data communication volume to a second size based on the at least one signal strength metric for the discovery beacon received from the first neighboring wireless station, wherein the second size of the data communication volume includes the first neighboring wireless station.

2. The wireless station of claim 1,
wherein, to establish the first size of the data communication volume, the at least one processor is configured to cause the wireless station to determine a first value of a signal strength metric threshold.

3. The wireless station of claim 1,
wherein, to adjust the data communication volume to the second size, the at least one processor is configured to cause the wireless station to decrease a signal strength metric threshold from a first value to a second value, wherein the signal strength metric associated with the first neighboring wireless station is between the first and second values.

4. The wireless station of claim 3,
wherein to decrease the signal strength metric threshold from a first value to a second value, the at least one processor is further configured to cause the wireless station to:
    decrease the signal strength metric by a predefined factor.

5. The wireless station of claim 1,
wherein the at least one processor is further configured to cause the wireless station to:
    receive a request to establish a data communication session with a second neighboring wireless station of the one or more neighboring wireless stations, wherein the second wireless station is located outside of the data communication volume based in part on a signal strength metric of the second wireless station not exceeding a first value of a signal strength metric threshold associated with the second size of the data communication volume; and adjust the first value of the signal strength metric threshold to a second value thereby adjusting the data communication volume to a third size to include the second wireless station.

6. The wireless station of claim 5, wherein the at least one processor is further configured to cause the wireless station to:
   discontinue the data communication session with the second neighboring wireless station; and
   adjust the signal strength metric threshold from the second value to the first value thereby adapting the data communication volume from the third size to the second size.

7. The wireless station of claim 1, wherein, to establish the first size of the data communication volume, the at least one processor is further configured to cause the wireless station to:
   determine the first size based, at least in part, on a minimum of an average signal strength metric of active data communication sessions.

8. The wireless station of claim 1, wherein, to establish the first size of the data communication volume, the at least one processor is further configured to cause the wireless station to:
   determine a signal strength metric threshold, wherein a value of the signal strength metric threshold is within a range, wherein the range is defined by a predetermined minimum and a predetermined maximum.

9. The wireless station of claim 8, wherein the signal strength metric is one of:
   received signal strength indicator; or
   signal-to-noise-plus-interference ratio.

10. An apparatus, comprising:
   a memory; and
   at least one processor in communication with the memory, wherein the at least one processor is configured to:
      establish a radio sphere for peer-to-peer data communications, wherein a first size of the radio sphere volume does not include neighboring wireless stations, and wherein the first size is based in part on a first value of a signal strength metric threshold;
      determine at least one signal strength metric for a discovery beacon received from a first neighboring wireless station of one or more neighboring wireless stations located outside of the radio sphere;
      determine to synchronize to the first neighboring wireless station of based in part on contents of a discovery beacon received from the first neighboring wireless station; and
      increase the radio sphere to a second size, wherein the second size of the radio sphere includes the first neighboring wireless station, and wherein the second size is based on a signal strength metric for the discovery beacon received from the first neighboring wireless station.

11. The apparatus of claim 10, wherein, to increase the radio sphere to the second size, the at least one processor is further configured to decrease a signal strength metric threshold from the first value to a second value, wherein the signal strength metric for the first neighboring wireless station is between the first and second values.

12. The apparatus of claim 10, wherein the at least one processor is further configured to:
   receive a request to establish a data communication session with a second neighboring wireless station of the one or more neighboring wireless stations, wherein the second wireless station is located outside of the radio sphere based in part on a signal strength metric of the second wireless station not exceeding the first value of the signal strength metric threshold; and
   increase the radio sphere to a third size, wherein the third size of the radio sphere includes the second wireless station.

13. The apparatus of claim 12, wherein the at least one processor is further configured to:
   discontinue the data communication session with the second neighboring wireless station; and
   adjust the radio sphere from the third size to the second size.

14. The apparatus of claim 10, wherein the at least one processor is further configured to:
   determine the first value based, at least in part, on a minimum of an average signal strength metric of active data communication sessions.

15. The apparatus of claim 10, wherein the first value of the signal strength metric is within a range, wherein the range is defined by a predetermined minimum and a predetermined maximum.

16. The apparatus of claim 10, wherein the signal strength metric is one of:
   received signal strength indicator; or
   signal-to-noise-plus-interference ratio.

17. A non-transitory computer readable memory medium storing program instructions executable by a processor of a wireless station to:
   establish a data communication volume for peer-to-peer data communications, wherein a first size of the data communication volume is based, at least in part, on a minimum of an average signal strength metric of active data communication sessions with neighboring peer devices;
   receive one or more discovery beacons from one or more neighboring peer devices located outside of the data communication volume;
   determine at least one signal strength metric for a discovery beacon received from a first neighboring peer device of the one or more neighboring peer devices;
   determine, based at least in part on contents of the discovery beacon received from the first neighboring peer device, to synchronize to the first neighboring peer device; and
   adjust the data communication volume to a second size based on the at least one signal strength metric for the discovery beacon received from the first neighboring peer device, wherein the second size of the data communication volume includes the first neighboring peer device.

18. The non-transitory computer readable memory medium of claim 17, wherein, to adjust the data communication volume to the second size, the program instructions are further executable to decrease a signal strength metric threshold from a first value to a second value, wherein the signal strength metric for discovery beacon received from the first neighboring peer device is between the first and second values.

19. The non-transitory computer readable memory medium of claim 17, wherein the program instructions are further executable to:

receive a request to establish a data communication session with a second neighboring peer device of the one or more neighboring peer devices, wherein the second peer device is located outside of the data communication volume based in part on a signal strength metric of the second peer device not exceeding a first value of a signal strength metric threshold associated with the second size of the data communication volume; and adjust the first value of the signal strength metric threshold to a second value thereby adjusting the data communication volume to a third size to include the second peer device.

20. The non-transitory computer readable memory medium of claim 19, wherein the program instructions are further executable to:

discontinue the data communication session with the second neighboring peer device; and adjust the signal strength metric threshold from the second value to the first value thereby adapting the data communication volume from the third size to the second size.

\* \* \* \* \*